(12) United States Patent
Whitworth et al.

(10) Patent No.: US 11,077,628 B2
(45) Date of Patent: Aug. 3, 2021

(54) METHOD FOR REPAIRING A COMPOSITE PART

(71) Applicant: Bell Textron Inc., Fort Worth, TX (US)

(72) Inventors: Denver Ray Whitworth, North Richland Hills, TX (US); Vance Newton Cribb, Aledo, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/566,580

(22) Filed: Sep. 10, 2019

(65) Prior Publication Data
US 2020/0001549 A1 Jan. 2, 2020

Related U.S. Application Data

(62) Division of application No. 15/691,278, filed on Aug. 30, 2017, now Pat. No. 10,406,764.

(51) Int. Cl.
| | |
|---|---|
| *B29C 73/06* | (2006.01) |
| *B29C 70/30* | (2006.01) |
| *B64F 5/40* | (2017.01) |
| *D03D 1/00* | (2006.01) |
| *D03D 15/00* | (2021.01) |
| *B29C 70/08* | (2006.01) |
| *B64C 7/00* | (2006.01) |
| *B29L 31/30* | (2006.01) |
| *B32B 17/10* | (2006.01) |

(52) U.S. Cl.
CPC ............ *B29C 70/30* (2013.01); *B29C 70/085* (2013.01); *B64C 7/00* (2013.01); *B64F 5/40* (2017.01); *D03D 1/00* (2013.01); *D03D 15/00* (2013.01); *B29L 2031/3076* (2013.01); *B32B 17/10963* (2013.01); *D10B 2505/02* (2013.01); *Y10T 428/20* (2015.01)

(58) Field of Classification Search
CPC ............ Y10T 428/20; Y10T 29/49718; Y10T 29/49732; Y10T 29/49734; Y10T 428/1369; Y10T 428/139; Y10T 428/1302; Y10T 428/24347; B64F 5/40; B29C 73/00; B29C 73/04; B29C 73/06; B29C 70/82; B29C 70/745; B32B 17/10963
See application file for complete search history.

(56) References Cited

U.S. PATENT DOCUMENTS

| | | |
|---|---|---|
| 4,622,091 A | 11/1986 | Letterman |
| 5,314,282 A | 5/1994 | Murphy et al. |

*Primary Examiner* — Alexander S Thomas
(74) *Attorney, Agent, or Firm* — Lightfoot & Alford PLLC (57) ABSTRACT

A method for repairing damage to a composite part includes creating an aperture through the composite part and preparing the surfaces surrounding the aperture on both sides of the part; inserting a plurality of resin impregnated fibers through the aperture and spreading the end portions of the plurality of fibers radially against the prepared surfaces on both sides of the part; and maintaining contact of the plurality of fibers with the prepared surfaces while the resin cures.

9 Claims, 10 Drawing Sheets

METHOD FOR REPAIRING A COMPOSITE PART

CROSS-REFERENCE TO RELATED APPLICATIONS

This is a divisional application of application Ser. No. 15/691,278, which was filed on 30 Aug. 2017 and entitled "METHOD FOR REPAIRING A COMPOSITE PART", the entire content of which is hereby expressly incorporated by reference. This application was patented on 10 Sep. 2019 and received U.S. Pat. No. 10,406,764.

BACKGROUND

Composite parts are both lightweight and strong, and therefore, composite parts are commonplace on aircraft where strength to weight ratio is extremely important. One problem with composite components is that when they are damaged, they are difficult to repair, and expensive to replace. The current methods of repairing a damaged fastener hole in a composite panel fail to restore structural integrity, add additional unwanted weight, and are time-consuming and complex. Accordingly, there is a need for a better method of repairing expensive composite components. This disclosure provides a method that restores structural integrity quickly, inexpensively, and without additional unwanted weight.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
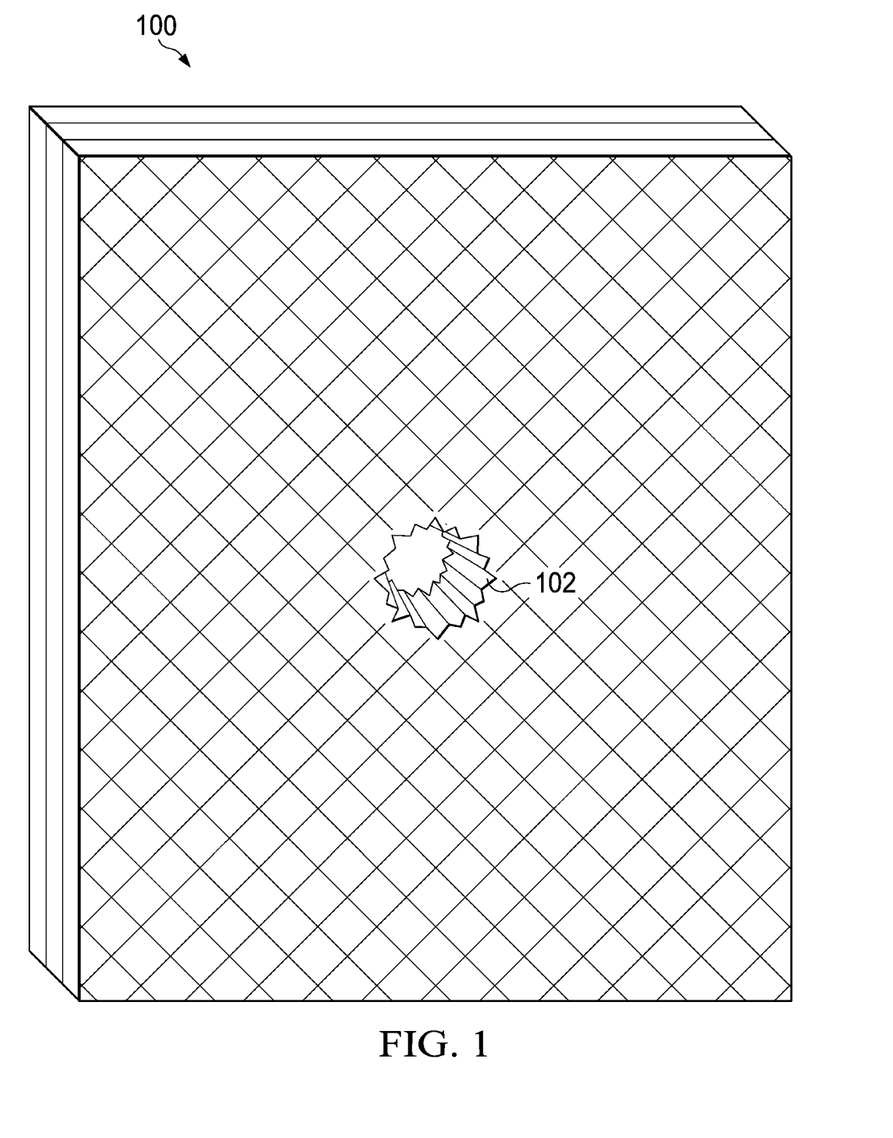
FIG. 1 is an oblique view of a composite panel with a damaged portion.

FIG. 1 illustrates a composite panel 100 with a damaged portion 102. Damaged portion 102 is shown as damage caused by a fastener pull-out. However, the method of repair described in this disclosure can be used to repair any type of damage to any composite part wherein the mechanic can access both sides of the composite part.

Figure 2:
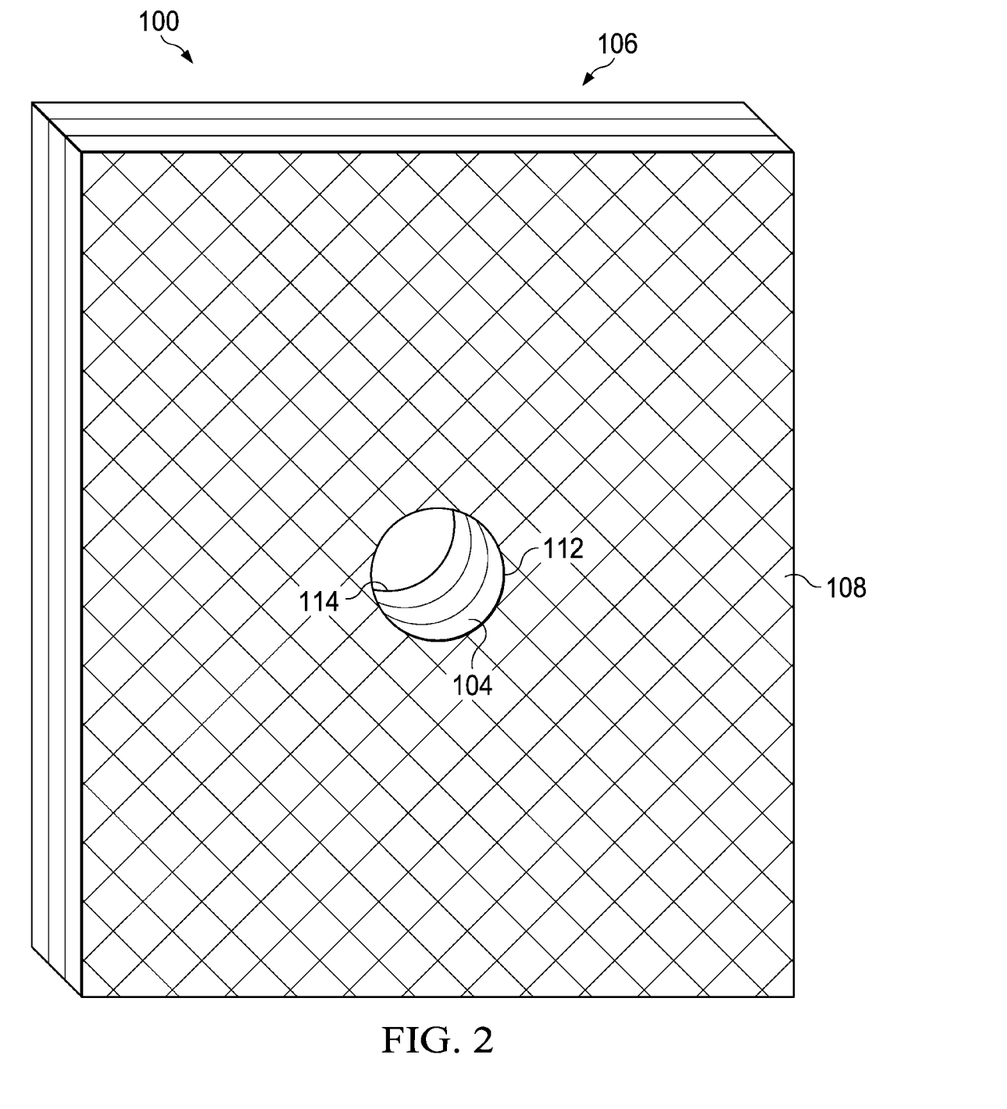
FIG. 2 is an oblique view of the composite panel of FIG. 1 with an aperture removing the damaged portion.

Referring to FIGS. 2-8, a method for repair of composite panel 100 is illustrated. As shown in FIG. 2, the first step is to create an aperture 104 that extends through a body 106 of composite panel 100 from a first side 108 of body 106 to an opposite second side 110 (shown in FIG. 6), effectively removing damaged portion 102. Aperture 104 may be created by drilling, reaming, boring, or any other method of creating an aperture 104. In order to preserve as much original structure as possible, aperture 104 should be as small as possible while removing the entirety of damaged portion 102. While not necessary, it may be advantageous to round or chamfer a first edge 112 between aperture 104 and first side 108, as well as a second edge 114 between aperture 104 and second side 110. These rounded edges will eliminate a sharp angle in the repair fibers inserted at a later step.

Figure 3:
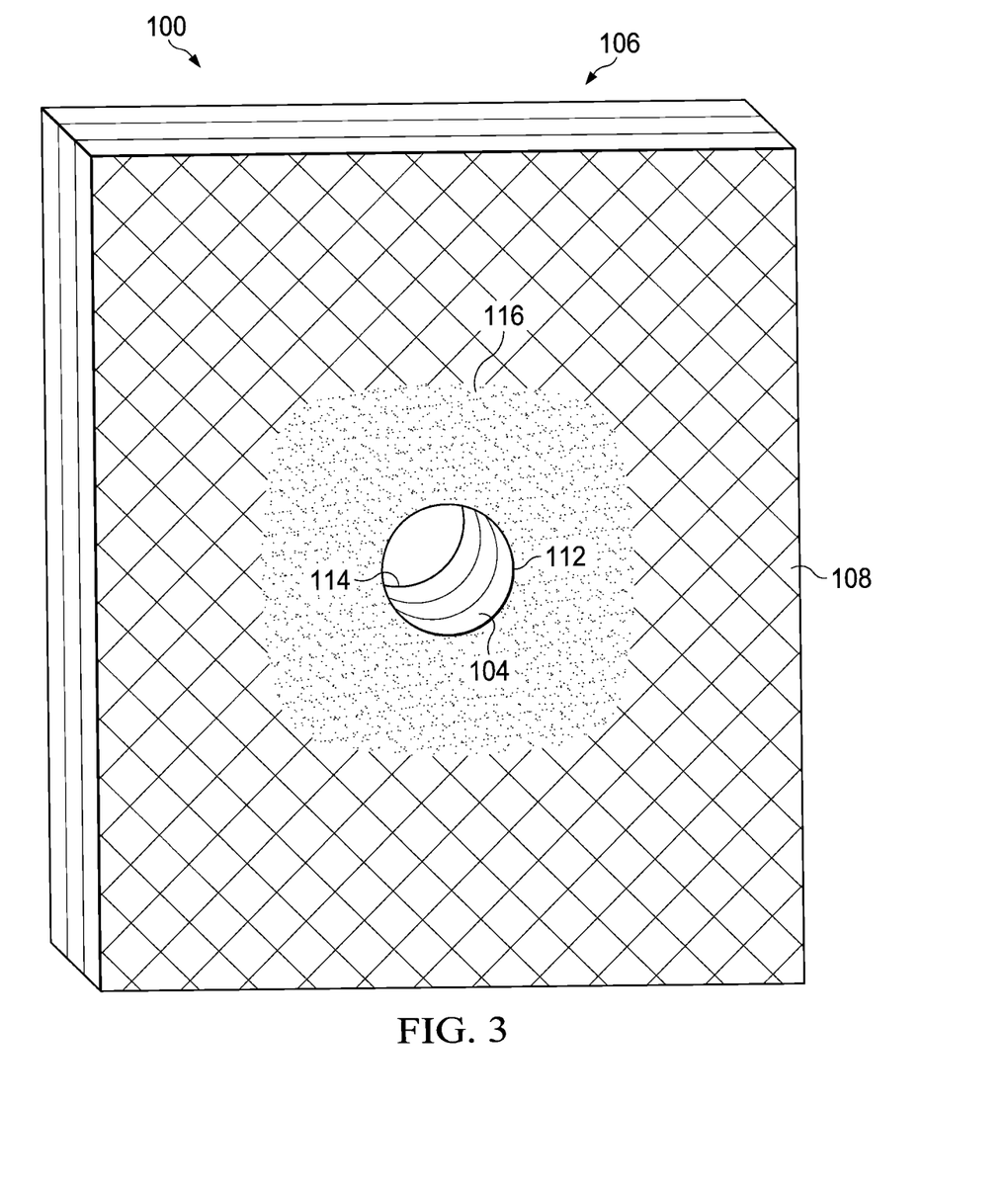
FIG. 3 is an oblique view of the composite panel of FIGS. 1 and 2 with a prepared surface surrounding the aperture.

As shown in FIG. 3, the next step is to prepare a first surface 116 surrounding aperture 104 on first side 108. First surface 116 is being prepared to bond new fibers thereto. As such, it is important to remove any paint or clear coat and to gently roughen the surface to promote a strong bond. Preparation may be accomplished by sanding (either wet or dry) or any other method (mechanical or chemical) suitable for preparing a surface for bonding to new resin and fiber. After sanding, it is important to thoroughly clean and dry first surface 116. After preparing first surface 116, perform the same procedure on a second surface 118 (shown in FIG. 6).

Figure 4A:
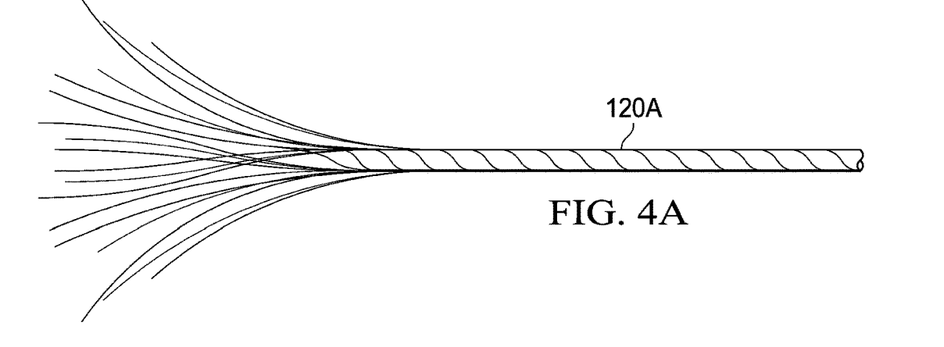
FIG. 4A is an oblique view of fiber tow.
Figure 4B:
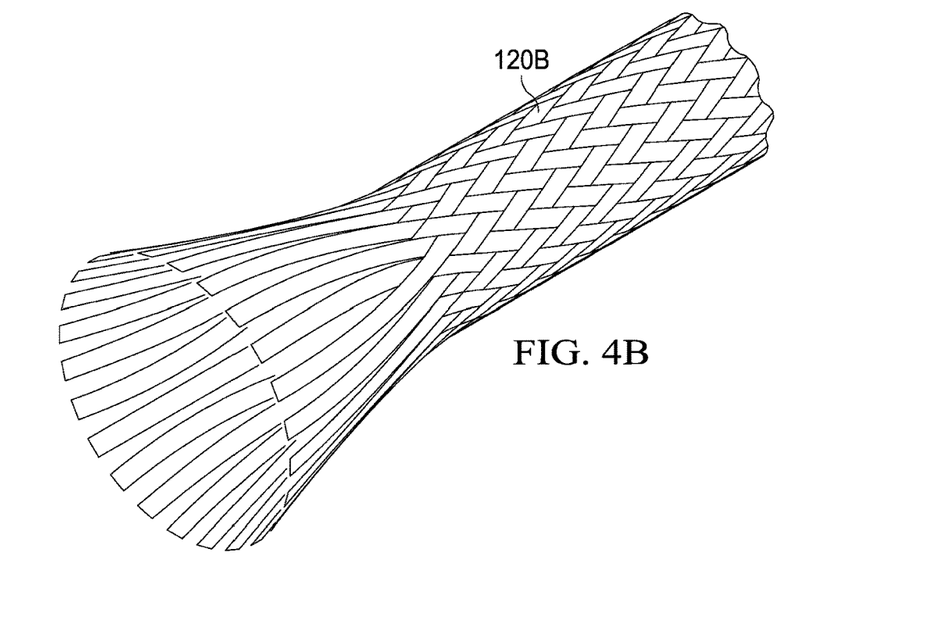
FIG. 4B is an oblique view of a braided fiber tube.
Figure 4C:
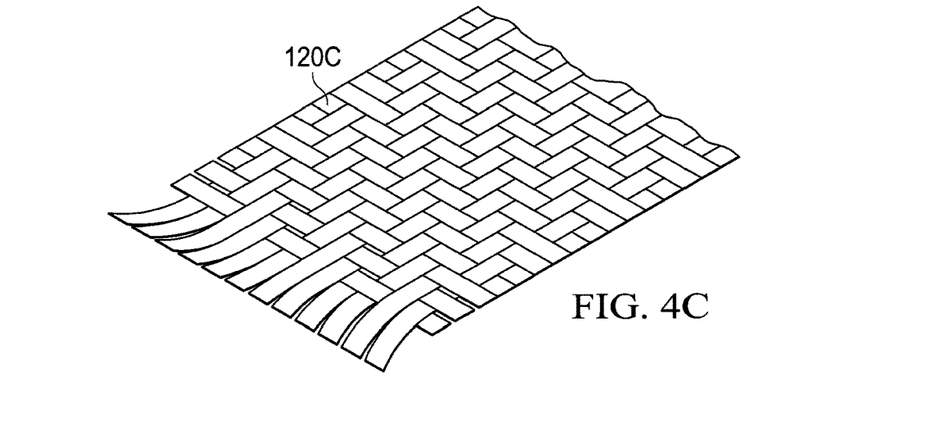
FIG. 4C is an oblique view of a woven fiber strip.

FIGS. 4A-4C show different types of fiber arrangements that may be utilized in the next step of repairing composite panel 100. FIG. 4A shows fibers arranged in a tow 120A, or an untwisted bundle, also commonly referred to as a roving when referring to carbon fibers or a yarn when referring to glass fibers. For the purposes of this disclosure, and the claims appended hereto, the terms tow, roving, and yarn are considered to be synonymous and may be applied to any fiber type. FIG. 4B shows fibers in the form of a braided tube 120B, and FIG. 4C shows fibers in the form of a woven strip 120C. Any of these pluralities of fibers 120 may be selected for repairing composite panel 100. After selecting which fibers to utilize, the number of fibers is determined. The number of fibers is based on the cross-sectional area of aperture 104. Plurality of fibers 120 are to be inserted through aperture 104, and plurality of fibers 120 should fit tightly within aperture 104. Depending on the diameter of aperture 104, more than one tow 120A, braided tube 120B, or woven strip 120C may be required to fill aperture 104. The number of tows 120A, braided tubes 120B, or woven strips 120C required may be calculated by dividing the cross-sectional area of aperture 104 by the cross-sectional area of a single tow 120A, braided tube 120B, or woven strip 120C. Alternatively, a table may be provided indicating the size and number of tows 120A, braided tubes 120B, or woven strips 120C recommended for various aperture 104 diameters. Plurality of fibers 120 may comprise carbon, glass, aramid, polyethylene, quartz, ceramic, or boron fibers, or any other fiber suitable for use in creating a composite part.

After selecting plurality of fibers 120, but prior to insertion through aperture 104, plurality of fibers should be impregnated with a resin. Alternatively, plurality of fibers 120 may be pre-impregnated from the manufacturer. After plurality of fibers 120 are impregnated with resin, they are inserted through aperture 104, preferably such that a midpoint of plurality of fibers 120 is located proximate a center of aperture 104. If plurality of fibers 120 comprise more than one tow 120A, braided tube 120B, or woven strip 120C, they may be oriented next to each other. In addition, if plurality of fibers 120 comprise more than one braided tube 120B, the tubes 120B may be oriented concentrically. Inserting plurality of fibers 120 through aperture 104 may be assisted by the use of a tool (not shown). For example, plurality of fibers 120 may be inserted through a funnel, the funnel inserted into aperture 104, and then the funnel removed from aperture 104 leaving behind plurality of fibers 120; plurality of fibers 120 may be attached to a tool and pulled through aperture 104; or plurality of fibers 120 may be pushed through aperture 104 using a needle-like tool. Because plurality of fibers 120 fit tightly within aperture 104, any extra resin on plurality of fibers 120 will be scraped off by first edge 112. This should self-regulate a fiber to resin ratio of between 30% fiber to 70% resin and 45% fiber to 55% resin. This high ratio of fiber to resin provides more structure while adding less weight than prior techniques which have a much lower fiber to resin ratio.

Figure 5:
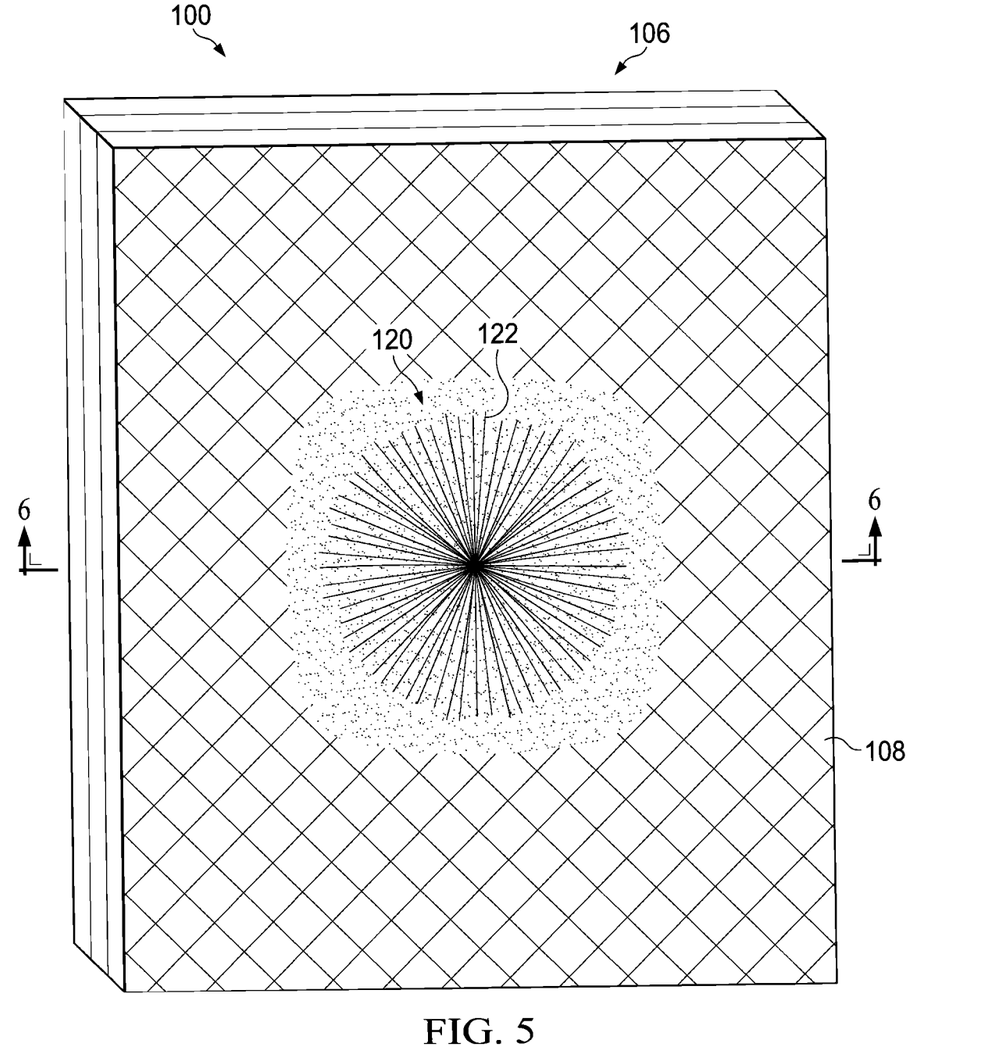
FIG. 5 is an oblique view of the composite panel of FIGS. 1-3 after being repaired in accordance with this disclosure.
Figure 6:
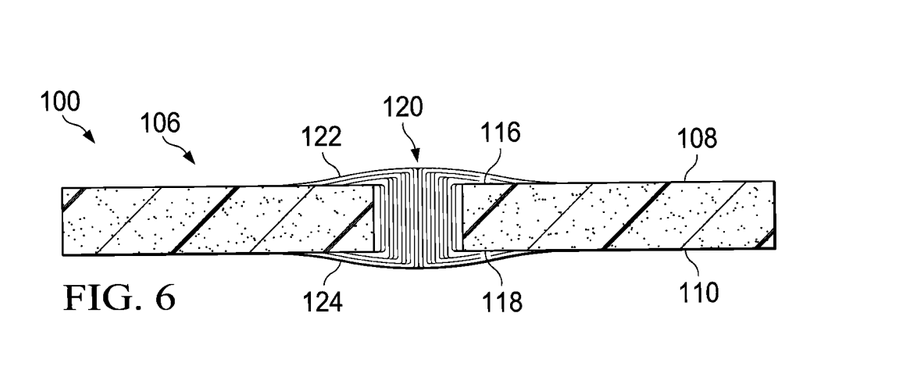
FIG. 6 is a cross-sectional view of the repaired composite panel shown in FIG. 5.

Referring to FIGS. 5 and 6, after plurality of fibers 120 are inserted in aperture 104, first end portions 122 of plurality of fibers 120 are spread radially outward from aperture 104 so that first end portions 122 are in contact with first surface 116. Then, second end portions 124 of plurality of fibers 120 are spread radially outward from aperture 104 so that second end portions 124 are in contact with second surface 118. After first and second end portions 122, 124 are placed in contact with first and second surfaces 116, 118, respectively, the contact therebetween must be maintained while the resin cures. Depending on the type of fiber and the type of resin, first and second end portions 122, 124 may maintain contact without the need for applying additional pressure thereto. However, it may be necessary to apply pressure to first and second end portions 122, 124 in order to maintain contact. This pressure may be applied by clamping plates (not shown) or inflatable bladders (not shown) or any other method of applying and maintaining pressure. Please note, for the purposes of this specification, and the claims appended hereto, "contact" between fibers and surfaces should be understood by one having ordinary skill in the art to include scenarios wherein the fiber and the surface are not in direct contact due to a thin layer of resin therebetween.

Figure 7:
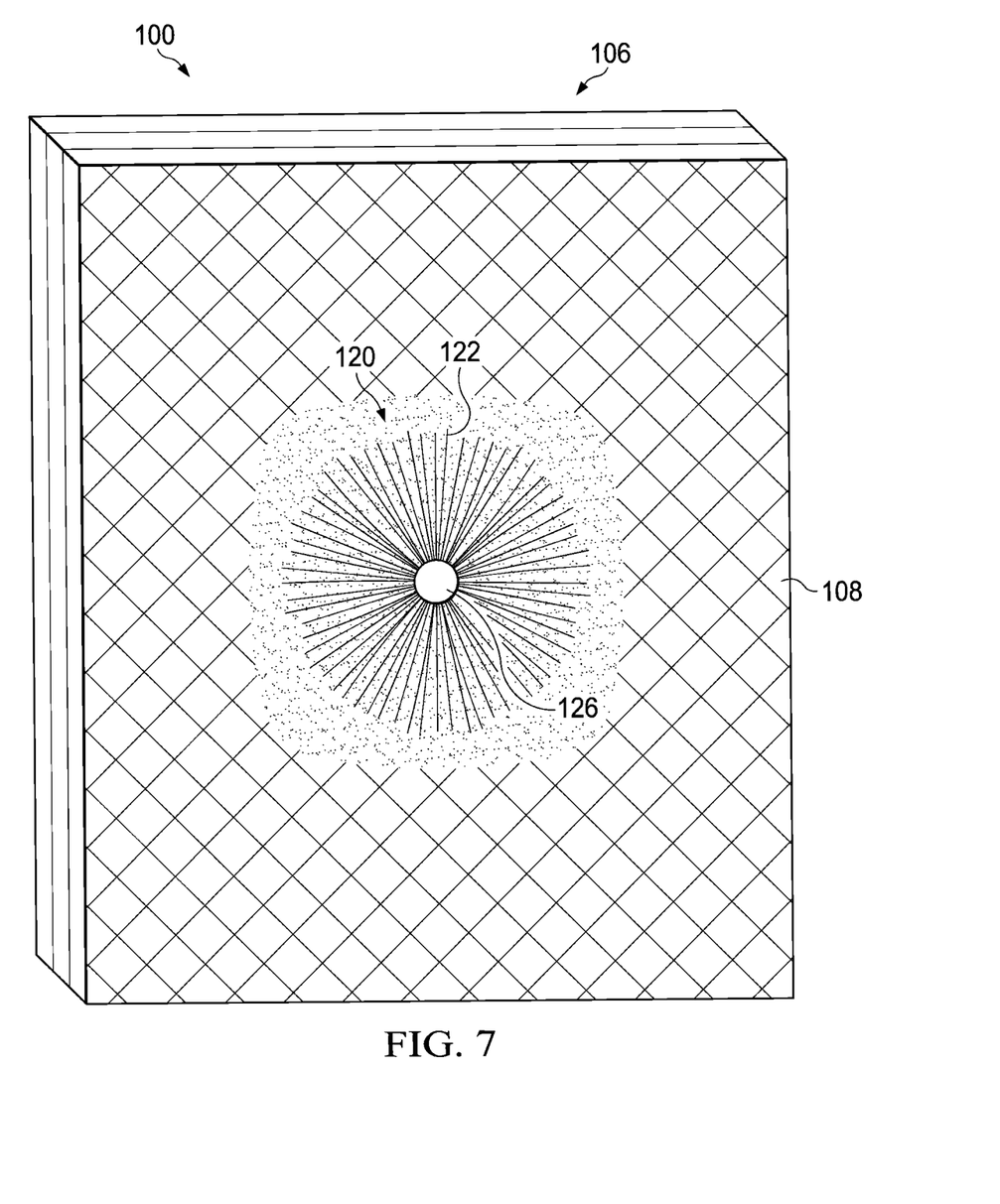
FIG. 7 is an oblique view the composite panel of FIGS. 1-3, 5, and 6 with a hole created through the repaired portion.
Figure 8:
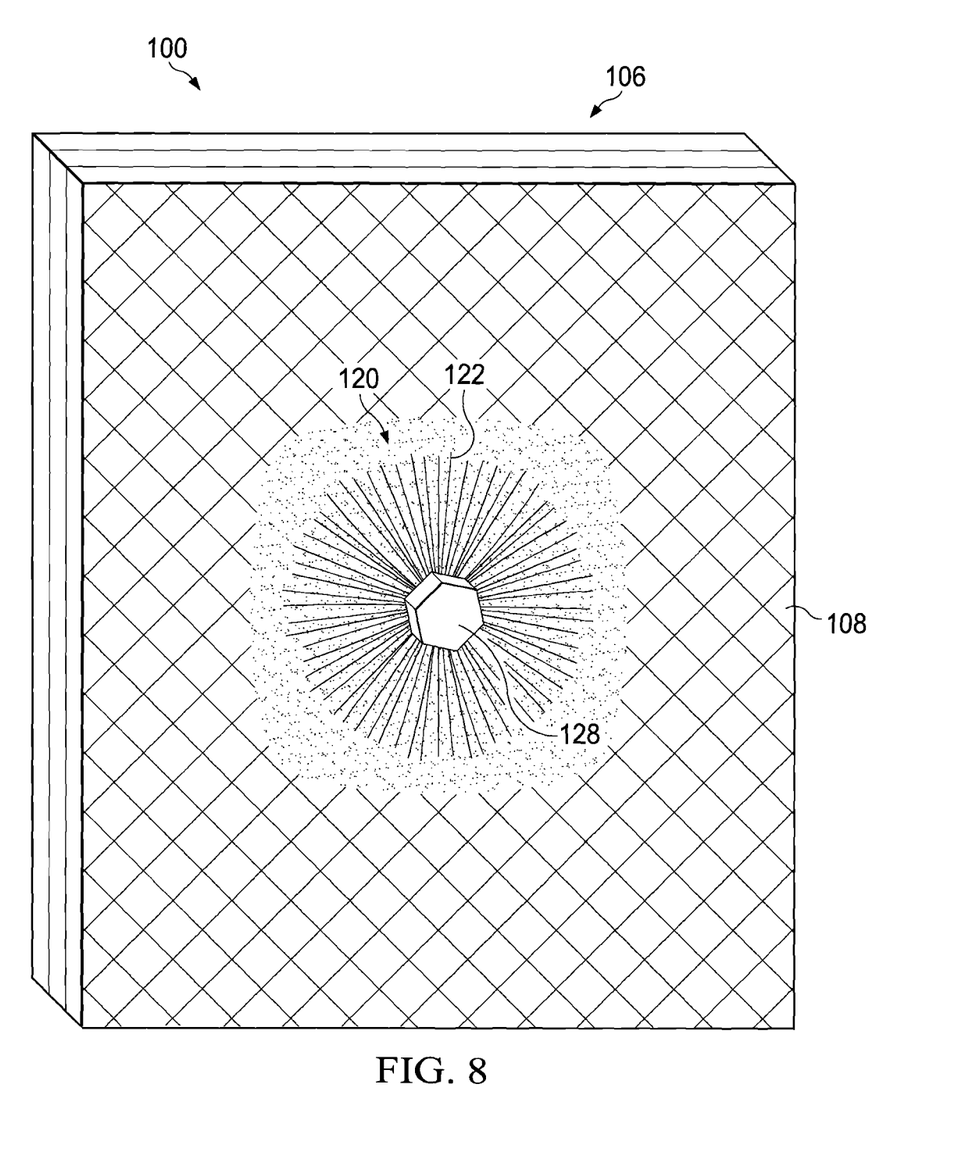
FIG. 8 is an oblique view of the repaired composite panel of FIG. 7 with a fastener inserted through the hole.
Figure 9:
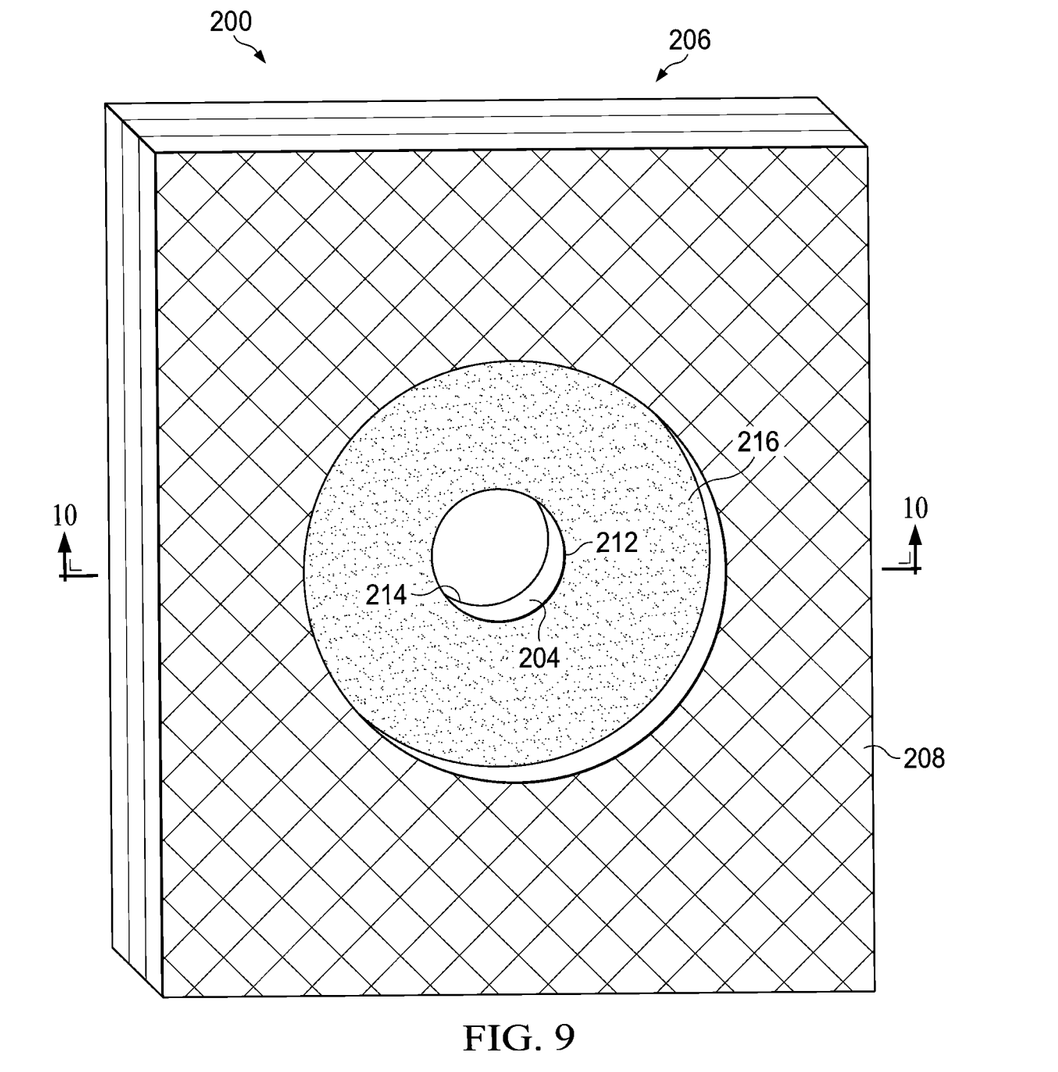
FIG. 9 is an oblique view of a composite panel with a spotfaced surface surrounding an aperture.
Figure 10:
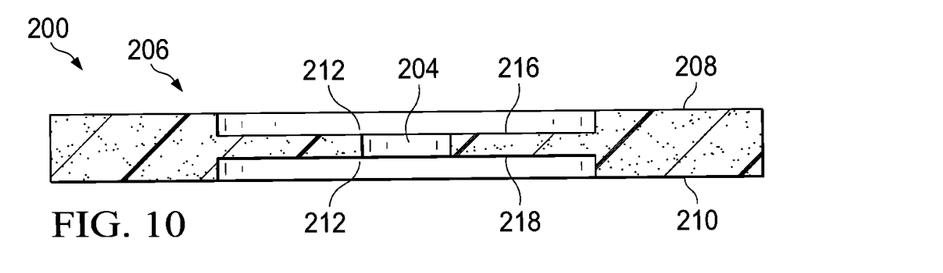
FIG. 10 is a cross-sectional view of the composite panel shown in FIG. 9.
Figure 11:
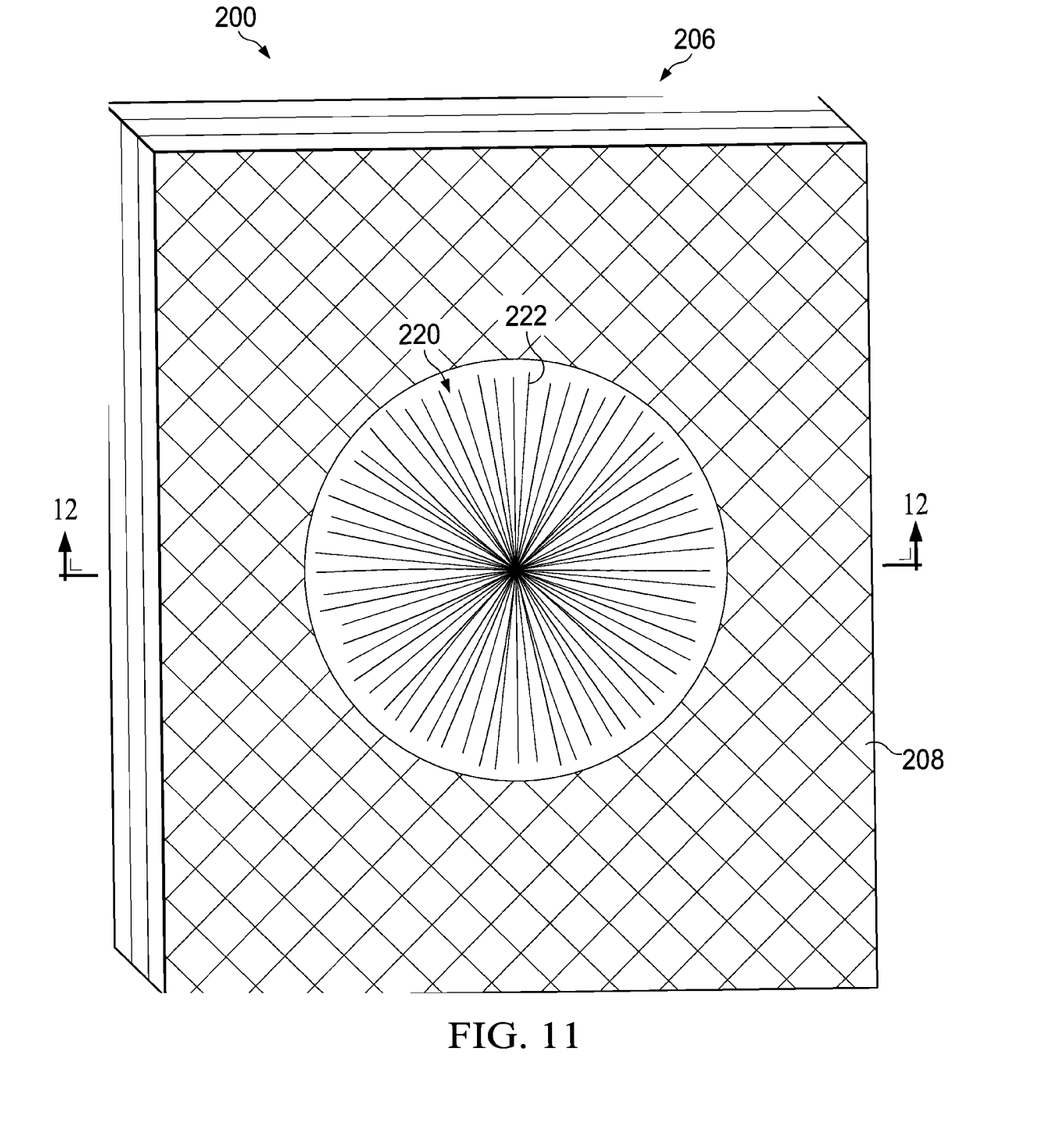
FIG. 11 is an oblique view of the composite panel shown in FIGS. 9 and 10 after being repaired.

As shown in FIGS. 7 and 8, after the resin cures, a new hole 126 may be created through a portion of plurality of fibers 120, and a fastener 128 may be inserted therethrough. Because hole 126 has smaller diameter than aperture 104, at least some of plurality of fibers 120 will remain uninterrupted in their connection between first surface 116 and second surface 118. This uninterrupted connection provides significant structural integrity not available from previous methods of repair. Alternatively, rather than drilling new hole 126, hole 126 may be formed during the repair process. In this alternative method, a mandrel is be inserted into aperture 104 prior to allowing the resin to cure. The mandrel should remain in place while the resin cures and it may be removed after curing, without drilling. In this alternative method, all of plurality of fibers 120 remain uninterrupted in their connection between first surface 116 and second surface 118.

Referring to FIGS. 9-12, an alternative method for repair of a composite panel 200 is illustrated. This method of repair is useful if the repaired panel is to be utilized in a manner that cannot tolerate an increase in a depth thereof. Like composite panel 100, composite panel 200 is prepared by creating an aperture 204 through a body 206 which removes a damaged portion thereof. However, instead of preparing areas surrounding aperture 204 on a first side 208 and a second side 210 by sanding, the areas surrounding aperture 204 are spotfaced. Spotfacing the area of first side 208 surrounding aperture 204 creates a recessed first surface 216. And spotfacing the area of second side 210 surrounding aperture 204 creates a recessed second surface 218. As discussed above, while not required, it may be advantageous to round or chamfer a first edge 212 between aperture 204 and recessed first surface 216, as well as rounding or chamfering a second edge 214 between aperture 204 and recessed second surface 218. It should be understood that first and second surfaces 216, 218 could be countersunk or counterbored instead of spotfaced. For the purposes of this disclosure, and the claims appended hereto, the term "spotfacing" shall be construed broadly to include creating a depression around an aperture. It should also be understood that one side of a composite panel may be sanded and the other side spotfaced.

Figure 12:
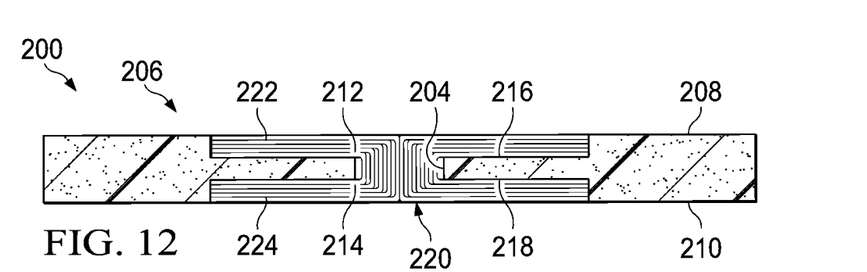
FIG. 12 is a cross-sectional view of the repaired composite panel of FIG. 11.

The remaining steps of the alternative method of repair are similar to those discussed above. The next step is selecting and determining the composition of a plurality of fibers 220 to utilize for repairing composite panel 200. Next, plurality of fibers 220 should be impregnated with a resin and inserted through aperture 204, preferably such that a midpoint of plurality of fibers 220 is located proximate a center of aperture 204. After plurality of fibers 220 are inserted through aperture 204, first end portions 222 of plurality of fibers 220 are spread radially outward from aperture 204 so that first end portions 222 are in contact with first surface 216. Then, second end portions 224 of plurality of fibers 220 are spread radially outward from aperture 204 so that second end portions 224 are in contact with second surface 218. After first and second end portions 222, 224 are placed in contact with first and second surfaces 216, 218, respectively, the contact therebetween must be maintained while the resin cures. It may be necessary to apply pressure to first and second end portions 222, 224 in order to maintain contact. This pressure may be applied by clamping plates (not shown) or inflatable bladders (not shown) or any other method of applying and maintaining pressure. As shown in FIG. 12, the repair of composite panel 200 did not increase the depth thereof. Accordingly, this method is particularly useful for applications on precision parts that must maintain their original geometry.

Figure 13:
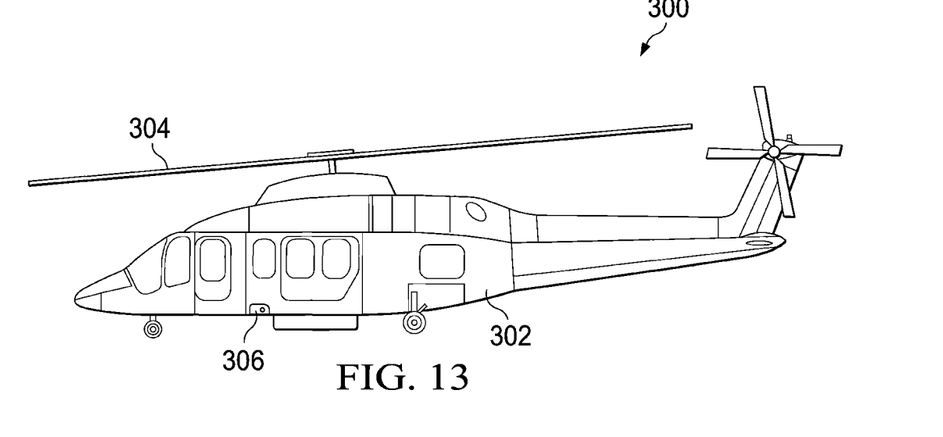
FIG. 13 is an aircraft including a repaired panel in accordance with this disclosure.

While the methods of repair discussed herein may be utilized for any composite part in any industry, it is particularly useful in the maintenance of aircraft, where a large portion of the aircraft is made of composite parts. As such, FIG. 13 shows an aircraft 300 with a fuselage 302, a system for generating lift 304, and a repaired composite panel 306. Repaired composite panel 306 may be structurally similar to repaired composite panel 100 or repaired composite panel 200, or any combination thereof.

At least one embodiment is disclosed, and variations, combinations, and/or modifications of the embodiment(s)

and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A composite panel, comprising:
   a body comprising a woven fiber and a resin, the body having a first surface and an opposite second surface, the body defining an aperture extending from the first surface to the second surface; and
   a plurality of fibers extending through the aperture and having first end portions secured to the first surface, second end portions secured to the second surface;
   wherein the aperture is filled with the plurality of fibers and a new resin;
   wherein the plurality of fibers comprises a portion of a braided tube.

2. The composite panel of claim 1, wherein the first end portions of the plurality of fibers are spread radially from the aperture onto the first surface, and the second end portions of the plurality of fibers are spread radially from the aperture onto the second surface.

3. The composite panel of claim 2, wherein the plurality of fibers comprise carbon, glass, aramid, polyethylene, quartz, ceramic, or boron fibers.

4. The composite panel of claim 3, wherein a ratio of fiber to resin within the aperture is between 30% fiber to 70% resin and 45% fiber to 55% resin.

5. The composite panel of claim 4, further including a hole extending through at least a portion of the plurality of fibers and having a fastener extending through the hole.

6. An aircraft, comprising:
   a fuselage;
   a system configured to generate lift; and
   a composite panel, comprising:
      a body comprising a woven fiber and a resin, the body having a first surface and an opposite second surface, the body defining an aperture extending from the first surface to the second surface; and
      a plurality of fibers extending through the aperture and having first end portions secured to the first surface, second end portions secured to the second surface;
      wherein the aperture is filled with the plurality of fibers and a new resin; and
      wherein the plurality of fibers comprises a portion of a braided tube.

7. The aircraft of claim 6, wherein a ratio of fiber to resin within the aperture is between 30% fiber to 70% resin and 45% fiber to 55% resin.

8. The aircraft of claim 7, wherein the composite panel further includes a hole extending through at least a portion of the plurality of fibers and having a fastener extending through the hole.

9. A composite panel, comprising:
   a body comprising a woven fiber and a resin, the body having a first surface and an opposite second surface, the body defining an aperture extending from the first surface to the second surface; and
   a plurality of fibers extending through the aperture and having first end portions secured to the first surface, second end portions secured to the second surface;
   wherein the aperture is filled with the plurality of fibers and a new resin;
   further comprising a hole extending through at least a portion of the plurality of fibers and having a fastener extending through the hole.

* * * * *